June 6, 1939.  W. B. STOUT  2,161,728
VENTILATOR
Filed March 23, 1936   2 Sheets-Sheet 1
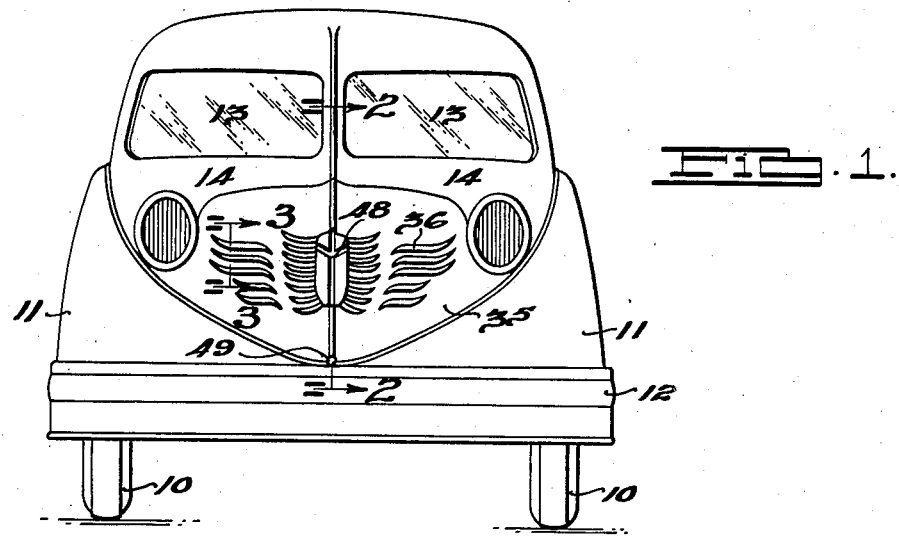
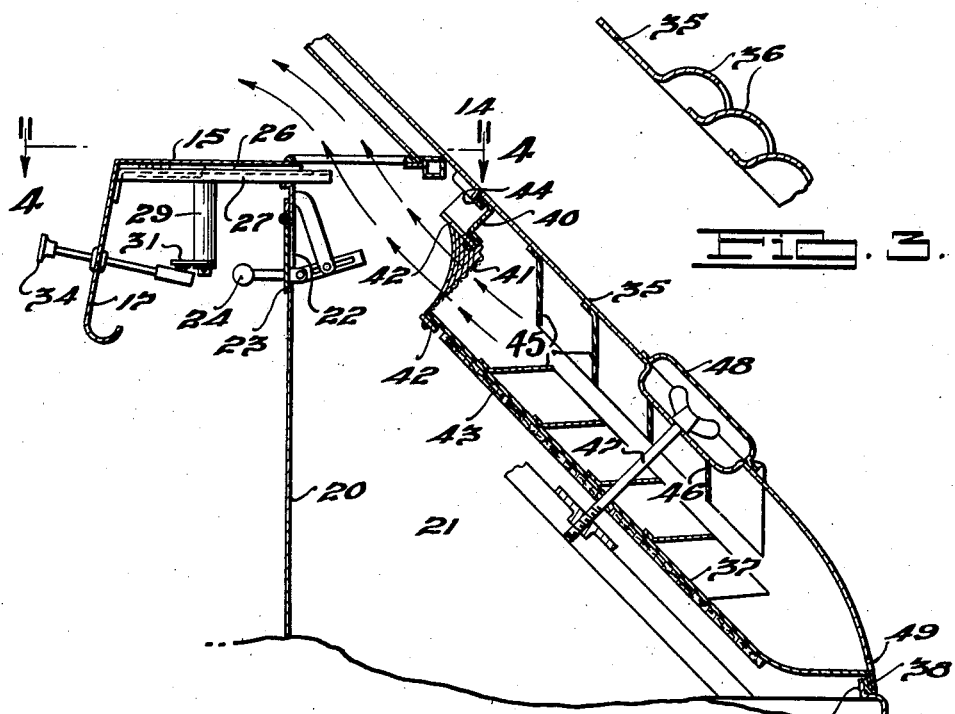
INVENTOR
William B. Stout.
BY
Harness, Dickey, Pierce & Hann
ATTORNEYS.

June 6, 1939. W. B. STOUT 2,161,728
VENTILATOR
Filed March 23, 1936 2 Sheets-Sheet 2
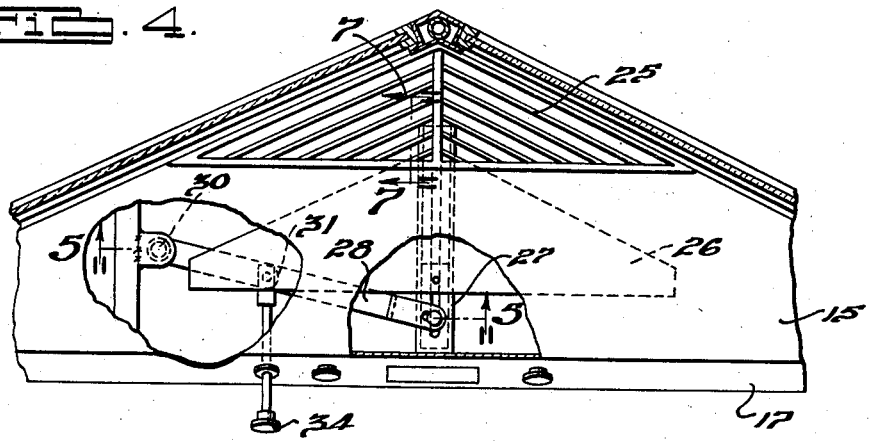
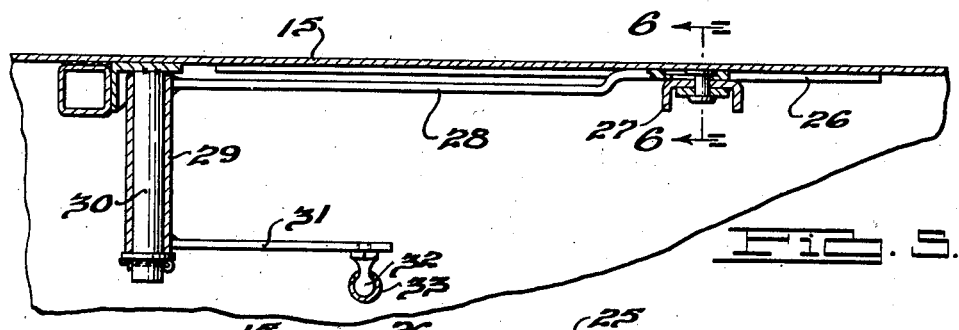
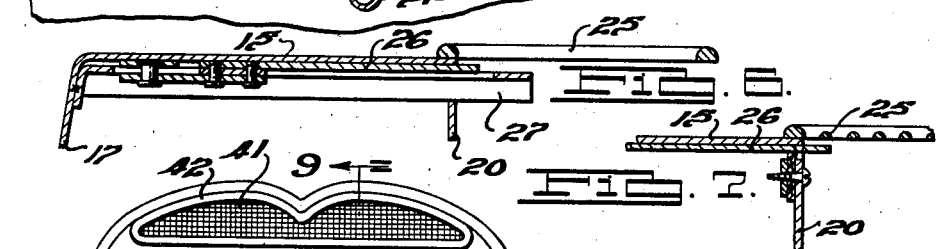
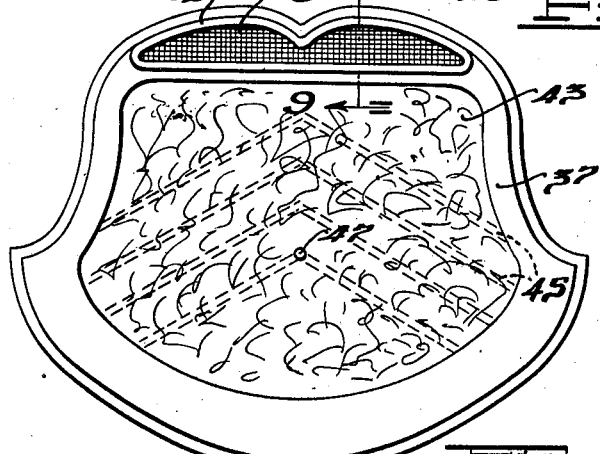
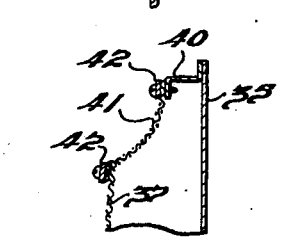
INVENTOR
William B. Stout
BY
ATTORNEYS Patented June 6, 1939

2,161,728

UNITED STATES PATENT OFFICE 2,161,728

VENTILATOR

William B. Stout, Detroit, Mich., assignor, by mesne assignments, to Stout Engineering Laboratories, Inc., Dearborn, Mich., a corporation of Michigan Application March 23, 1936, Serial No. 70,183

8 Claims. (Cl. 98—2)

This invention relates to automobile body constructions. More particularly it relates to a novel and unique front end construction for automotive vehicles, including particularly effective means providing ventilation for the interior of the body construction.

While the specific embodiment of the invention disclosed in the accompanying drawings relates to an automobile body construction having an engine in the rear thereof, it will be appreciated that in some aspects the present inventive concept will find practical utility in conventional automobile constructions in which the motor is mounted at the forward end thereof.

It is a general object of the present invention to provide a front end construction for automotive vehicles including a novel arrangement of parts, which provide means for effectively ventilating the passenger compartment of the vehicle and at the same time provide effective means for controlling such ventilation.

The present invention contemplates the provision of structure including a ventilator compartment at the forward end of the vehicle having means in the front thereof to admit air from outside the vehicle body. A novel arrangement of dampers provides means whereby this air may be admitted from the ventilator compartment into the passenger compartment of the vehicle and may either be directed upwardly toward the roof of the passenger compartment or may be admitted directly to the lower portion thereof. Means are provided for controlling the admission of air to the various portions of the passenger compartment of the vehicle and independent actuating mechanism is provided for controlling each of these sources of admission of air. This construction has been found to provide effective means for eliminating undesirable drafts and yet, at the same time, providing a thorough and constant supply of fresh air to the interior of the vehicle.

The invention further contemplates the provision of a compartment located forwardly of the passenger compartment, having means therein for mounting a spare tire, the said compartment also providing means by which air from outside the vehicle can be introduced into the interior thereof.

Still further the invention contemplates the provision of a vehicle body construction in which a substantially horizontally extending panel has its forward edge mounted adjacent the base of the windshield and which panel extends substantially rearwardly and serves to support the upper marginal edge of the instrument board. Suitable vents are provided in this rearwardly extending panel and provide means for admitting air to the interior of the vehicle.

Many other and further objects of the invention will become clearly apparent from the following specification when considered in connection with the accompanying drawings forming a part thereof.

In the drawings:

Figure 1 is a front elevational view of an automobile body embodying the novel features of the present invention;

Figure 2 is a longitudinal, vertical, sectional view, taken substantially on the line 2—2 of Figure 1, illustrating in detail the construction and arrangement of the front end of the vehicle;

Figure 3 is an enlarged, sectional view, taken substantially on the line 3—3 of Figure 1, illustrating in detail the construction of the louvers for admitting air to the ventilator compartments;

Figure 4 is a transverse, sectional view, taken substantially on the line 4—4 of Figure 2, illustrating in detail the vents for admitting air to the upper portion of the passenger compartment of the vehicle and the damper and operating mechanism for controlling this vent;

Figure 5 is a sectional view, taken substantially on the line 5—5 of Figure 4, illustrating in detail the operating mechanism for controlling the vents shown therein;

Figure 6 is a transverse, sectional view, taken substantially on the line 6—6 of Figure 5, illustrating in detail the actuating mechanism for the damper construction shown therein;

Figure 7 is a sectional view, taken substantially on the line 7—7 of Figure 4, illustrating in detail the grill work covering the vents for admitting air to the upper portion of the vehicle body;

Figure 8 is a rear elevational view of the cover for the ventilator compartment, showing the interior construction thereof;

Figure 9 is an enlarged, transverse, sectional view, taken substantially on the line 9—9 of Figure 8, illustrating in detail the mounting of the filter screen in the removable cover.

With more particular reference to the drawings, the specific embodiment of the invention disclosed therein shows an automobile supported on wheels 10 which are enclosed by a fender panel 11, extending substantially entirely across the front of the vehicle and serving to support the bumper 12. A rearwardly sloping windshield of the V-type comprising a pair of permanently mounted panes of glass 13, is mounted adjacent the front end of the vehicle and it will be seen that the cowling 14 therearound slopes downwardly and forwardly to mate with the wheel enclosing housings 11.

Interiorly of the body of the vehicle a dash panel 15 is provided, the forward marginal edge of which is secured adjacent the base of the windshield. This panel is preferably permanently mounted in place and extends horizontally rearwardly to provide a shelflike structure immediately interiorly of the windshield construction. The rear marginal edge of this panel is bent downwardly to form an instrument board 17, in which the various customary instruments may be mounted.

A dashboard 20 extends between the floor of the vehicle and the under-side of the dash panel 15 to define forwardly thereof a ventilator compartment 21. This ventilator compartment communicates with the interior of the vehicle body through a suitable aperture 22 formed in the wall thereof and controlled by means of a pivotally mounted damper 23 in the dashboard. The damper 23 may be controlled by means of a suitable handle 24, easily accessible from the front seat of the vehicle, and is preferably mounted in order that its position may be accurately adjusted. It will be noted that the damper 23 as a whole is hinged from the top and consequently it tends to deflect air passing therethrough downwardly toward the floor of the car in order that said air will pass out underneath the instrument board and ventilate the lower portion of the vehicle body as a whole.

A second opening from the ventilator compartment 21 to the body of the vehicle provides means for ventilating the upper portion of the car. This opening may take the form of a substantially triangular aperture, covered by means of a suitable grill-work 25, clearly seen in Figure 4. This structure permits the passage of air from the ventilator compartment 21 upwardly along the interior surface of the windshield to the upper portion of the passenger compartment of the vehicle. A damper 26 is slidably mounted underneath the dashboard panel 15 by means of a channel member 27 secured to the dash panel and spaced slightly therefrom, in order that the damper may be disposed between the channel member and the dash panel. It will be seen that this damper 26 is of a configuration adapted to close the opening covered by the grill-work 25 and that the damper as a whole is movable substantially in the plane of the panel 15. The damper 26 is preferably operated by means of an actuating arm 28 secured to a sleeve 29 which is journaled upon a fixed stud 30 permanently secured to the underside of the panel 15 and to the adjacent framework. The sleeve 29 has a crank 31 extending therefrom which has on the end thereof a suitable ball member 32 adapted to be engaged by a socket 33 on the inner end of a push rod 34, which projects through the instrument board.

From the structure described above, it will be apparent that the damper 26 may be moved to open and closed position with respect to the aperture with which it is associated by means of the push rod 34 and that the position of this damper may accurately be adjusted as may be desired.

Novel and particularly effective means are provided for admitting clean, fresh air from the exterior of the vehicle body into the ventilator compartment 21 from whence the air may be distributed to the interior of the passenger compartment as may be desired by means of the dampers 23 and 26 described above. The apparatus for admitting air comprises a cover member which is adapted to seat in the aperture in the front of the vehicle defined by the cowling 14 and the fender structures 11. This cover member comprises a unitary structure formed of two sheet metal sections secured together in their marginal edges and spaced substantially from one another in their body portions. The outer section 35 of this cover member provides the reveal portions for the front of the vehicle and consequently may be decorated in any suitable manner, such as may be desired. This member preferably has a plurality of louvers 36 formed therein, which may be formed integrally as upstruck portions of the sheet metal member from which the section 35 is formed.

The cover member as a whole includes a baffle member 37 which is provided with a flange 38 in its lower marginal edge adapted to mate with and be permanently secured to the lower marginal edge of the outer cover section 35. This baffle section 37 is preformed so that the body portion thereof will lie substantially parallel to and in spaced relation with respect to the outer section 35. A strip of rolled section 40 has a flanged edge thereof mating with and secured to the upper marginal edge of the outer cover section 35, and it will be seen by reference to Figure 9 that the inner edge of this strip of rolled section provides a surface to which one edge of a filter screen 41 may be secured by means of a suitable clamping strip 42 which extends entirely around this opening and also serves to secure the marginal edge of the filter screen to the upper marginal edge of the baffle panel.

It will be appreciated that this cover structure comprising the outer cover section 35 in the inner baffle section 37 together with the filter screen 41 provides a substantially unitary construction, which is provided in its marginal edge with an outwardly extending flange adapted to seat in a rabbet 44 formed in the paneling surrounding the opening in the front of the vehicle. The outer cover panel 35 is preferably slightly depressed in its central portion to form a recess 46 adapted to house the head of a wing bolt 47 which may be utilized for the purpose of securing the cover structure in position in the vehicle. The recess 46 may be covered by means of a suitable finish plate 47 secured thereto in any convenient manner.

The two sections of sheet metal 35 and 37 from which the cover is formed may be each provided with a plurality of baffles 45 which serve to aid in positively precluding the entrance of water or foreign matter to the compartment 21.

If desired, means may be provided interiorly of the ventilator compartment 21 for mounting a spare tire or wheel or otherwise utilized as storage space.

From the foregoing construction, it will be appreciated that particularly simple and effective means are provided for admitting air to the ventilator compartment and that the air thus admitted may pass directly upwardly along the interior surface of the windshield or may be directed downwardly toward the floor of the car by passing through the aperture 22 controlled by the damper 23. It will be appreciated that inasmuch as these dampers are independently regulated, the amount and proportion of air flowing in either direction may be accurately and conveniently adjusted by the operator of the vehicle in order that the ventilation may have the desired character.

It will be appreciated that the outer or cover panel 35 slopes downwardly and forwardly at substantially the same angle as the slope of the windshield and consequently the baffle section 37, which is secured thereto, also slopes downwardly and forwardly. It will be appreciated that air entering through the louvers 36 may at times carry with it considerable moisture and foreign matter. It will be seen that the moisture or rain drops will impinge upon the baffle 37 and due to the slope thereof will drain downwardly and may drain off through a suitable vent 49 at the base of this panel. Likewise, it will be appreciated that foreign matter separated from the air by means of the filter screen 41 will by gravity fall to the lower portion of the cover section and be washed therefrom in due course.

The above described form of the invention is merely illustrative of the generic inventive concept presented in this application. Many other and further modifications thereof, falling within the scope of the invention, defined in the subjoined claims, will be apparent to those skilled in the art.

I claim as my invention:

1. In a vehicle body construction having a storage compartment in the forward end thereof, a cover structure providing access to the interior of said storage compartment, said cover comprising inner and outer sections of material substantially spaced in their body portions and secured together throughout a portion of their marginal edges to provide an integral unit construction, the outer of said sections being provided with louvers for admitting air between said sections and thence to the interior of said storage compartment.

2. In a vehicle body construction having a storage compartment in the forward end thereof, a removable cover member providing access to said storage compartment, said cover member comprising inner and outer sections of material secured together in their marginal edges and substantially spaced in their body portions, louvers in the outer of said sections for admitting air from the exterior of the vehicle between said sections, and a filter member carried by said cover structure for filtering air passing from said cover structure into said storage compartment.

3. In a vehicle body construction, paneling defining an enclosed storage compartment at the forward end of the vehicle, a rearwardly extending instrument board closing the upper portion of said compartment and extending rearwardly therefrom, said instrument board being apertured to admit air from said storage compartment upwardly into the passenger compartment of said vehicle, said compartment being provided with an aperture beneath said instrument board to permit air from said compartment to enter said vehicle beneath said instrument board, dampers for closing each of said apertures, a closure for the front end of said compartment removably mounted on said vehicle, said closure having louvres therein adapted to admit air to said storage compartment and means carried by said closure for directing said air upwardly toward the upper portion of said compartment.

4. In a vehicle body construction having a storage compartment at the forward end thereof, paneling separating said storage compartment from the passenger compartment of said vehicle body, said paneling having apertures therein to permit air from said storage compartment to pass into said passenger compartment, dampers for closing said apertures, a cover member for the forward portion of said compartment removably mounted thereon to provide access thereto, and louvres in said cover for admitting air to said storage compartment, and means carried by said closure member serving to filter the air thus admitted.

5. In a vehicle body construction having a storage compartment at the forward end thereof, paneling separating said storage compartment from the passenger compartment of said vehicle body, said paneling having apertures therein to permit air from said storage compartment to pass into said passenger compartment, dampers for closing said apertures, a cover member for the forward portion of said compartment removably mounted thereon to provide access thereto, louvres in said cover for admitting air to said storage compartment, a baffle plate having its marginal edges secured to the marginal edges of said cover, and having its body portion spaced therefrom serving to direct the air entering through said louvres to the upper portion of said storage compartment and thus serving to exclude moisture and foreign matter therefrom.

6. In a vehicle body construction having a storage compartment at the forward end thereof, paneling separating said storage compartment from the passenger compartment of said vehicle body, said paneling having apertures therein to permit air from said storage compartment to pass into said passenger compartment, dampers for closing said apertures, a cover member for the forward portion of said compartment removably mounted thereon to provide access thereto, louvres in said cover for admitting air to said storage compartment, a baffle plate having its marginal edges secured to the marginal edges of said cover, and having its body portion spaced therefrom serving to direct the air entering through said louvres to the upper portion of said storage compartment, thus serving to exclude moisture and foreign matter therefrom, and means disposed between said cover member and baffle member for filtering the air entering said compartment.

7. In a vehicle body construction having a storage and ventilating compartment at the forward end thereof, means for establishing connection between said storage and ventilating compartment and the passenger compartment of said vehicle, a closure member removably enclosing the forward end of said storage compartment thereby providing access to the interior thereof, said closure member comprising a cover plate and a baffle plate secured together in their lower and side marginal edges and spaced from each other in their body portions and upper marginal edges, said cover plate having louvres therein adapted to admit air to the interior of said storage compartment, said baffle plate serving to direct said air upwardly into the upper portion of said storage compartment.

8. In a vehicle body construction having a storage and ventilating compartment at the forward end thereof, means for establishing connection between said storage and ventilating compartment and the passenger compartment of said vehicle, a closure member removably enclosing the forward end of said storage compartment thereby providing access to the interior thereof, said closure member comprising a cover plate and a baffle plate secured together in their lower and side marginal edges and spaced from each other in their body portions and upper marginal edges, said cover plate having louvres therein adapted to admit air to the interior of said storage compartment, said baffle plate serving to direct said air upwardly into the upper portion of said storage compartment, said closure member being mounted in sloping position and being provided with a drain vent whereby moisture and foreign matter impinging upon said baffle may drain therefrom without entering said storage compartment.

WILLIAM B. STOUT.